US008267568B2

(12) United States Patent
Cho et al.

(10) Patent No.: US 8,267,568 B2
(45) Date of Patent: Sep. 18, 2012

(54) DISPLAY DEVICE INCLUDING LIGHT GUIDE PLATE AND DISPLAY PANEL

(75) Inventors: Joo-Woan Cho, Chungcheongnam-do (KR); Yong-Woo Lee, Gyeonggi-do (KR); Se-Ki Park, Chungcheongnam-do (KR)

(73) Assignee: Samsung Electronics Co., Ltd. (KR)

( * ) Notice: Subject to any disclaimer, the term of this patent is extended or adjusted under 35 U.S.C. 154(b) by 426 days.

(21) Appl. No.: 12/690,001

(22) Filed: Jan. 19, 2010

(65) Prior Publication Data
US 2011/0044071 A1 Feb. 24, 2011

(30) Foreign Application Priority Data

Aug. 21, 2009 (KR) .............................. 2009-0077768

(51) Int. Cl.
*F21V 7/04* (2006.01)
(52) U.S. Cl. ....... 362/633; 362/632; 362/634; 362/97.2; 362/97.3; 362/97.4
(58) Field of Classification Search .......... 362/632–634, 362/97.1–97.4
See application file for complete search history.

(56) References Cited

U.S. PATENT DOCUMENTS

| | | | | |
|---|---|---|---|---|
| 7,086,761 B2* | 8/2006 | Won et al. | ...................... | 362/373 |
| 7,226,201 B1* | 6/2007 | Li et al. | .......................... | 362/633 |
| 7,452,121 B2* | 11/2008 | Cho et al. | ...................... | 362/633 |
| 7,665,878 B2* | 2/2010 | Hsieh | ............................. | 362/633 |
| 7,850,360 B2* | 12/2010 | Park et al. | ..................... | 362/633 |
| 2001/0050731 A1 | 12/2001 | An et al. | | |
| 2007/0273808 A1 | 11/2007 | Hsu et al. | | |
| 2009/0009669 A1 | 1/2009 | Zuidema et al. | | |
| 2009/0262554 A1* | 10/2009 | Lee et al. | ...................... | 362/633 |

FOREIGN PATENT DOCUMENTS

| | | |
|---|---|---|
| JP | 2007-026916 A | 2/2007 |
| JP | 2007-334220 A | 12/2007 |
| JP | 2009-080210 A | 4/2009 |
| JP | 2009-098310 A | 5/2009 |
| KR | 1020020035914 A | 5/2002 |
| KR | 1020080026911 A | 3/2008 |
| KR | 1020090043799 A | 5/2009 |
| KR | 1020090047569 A | 5/2009 |
| KR | 1020090047789 A | 5/2009 |

* cited by examiner

*Primary Examiner* — Stephen F Husar
*Assistant Examiner* — James Cranson, Jr.
(74) *Attorney, Agent, or Firm* — Innovation Counsel LLP (57) ABSTRACT

A display device includes a light source assembly, a light guide plate (LGP), a lower receiving container, a reinforcing member, a display panel and an upper receiving container. The lower receiving container includes a first coupling portion formed on the first bottom surface. The reinforcing member includes a pressing down part structured to pressing down on an upper surface adjacent to a corner portion of the LGP and a fixing part integrally extending from an end portion of the pressing down part in parallel with a first sidewall of the lower receiving container to have a second coupling portion being coupled with the first coupling portion. The reinforcing member covers the light source assembly. The display panel is disposed on the LGP and the reinforcing member. The upper receiving container includes a third coupling portion coupled to the first coupling portion and the second coupling portion through a coupling member.

20 Claims, 9 Drawing Sheets

DISPLAY DEVICE INCLUDING LIGHT GUIDE PLATE AND DISPLAY PANEL

PRIORITY STATEMENT

This application claims priority under 35 U.S.C. §119 to Korean Patent Application No. 2009-77768, filed on Aug. 21, 2009 in the Korean Intellectual Property Office (KIPO), the contents of which application are herein incorporated by reference in their entirety.

BACKGROUND

1. Field of Disclosure

The present disclosure of invention relates to display devices. More particularly, the present disclosure relates to a thin display device having enhanced stiffness reinforcement.

2. Description of Related Technology

A liquid crystal display (LCD) device has many merits, for example, superior display quality, small size, light weight, thin thickness, low power consumption, etc., in comparison with a Braun tube (a.k.a. CRT). Thus, the LCD device has been used in various fields.

Recently, as a display area size of the LCD device is increased and a panel thickness of the LCD device is decreased in response to market demands, a thickness of optical members such as a light guide plate (LGP) employed in the LCD device and thicknesses of an upper receiving container and a lower receiving container have been becoming thinner and thinner.

However, when the thickness of elements employed in the LCD device is very thin, elements of the LCD device are more easily bent or torsion or twisting of the elements occurs during a manufacturing process thereof and thus reliability and ability to cope with external impacts is decreased.

Moreover, heat is generated from a light emitting element such as a light emitting diode (LED) in the LCD device, and thus an adjacent light incident surface of an LGP receives the heat.

When the light incident surface of the LGP receives the heat, the LGP tends to become bent or torsed so that an alignment between the light emitting element and the LGP is deviated. Thus, light incident efficiency is decreased, and lights are leaked.

As described above, as elements of the LCD device become thinner, reliability thereof is decreased so that display quality and display efficiency of the LCD device are decreased. Moreover, as heat is applied to the LGP, the LGP tends to become bent or torsed so that display quality and display efficiency of the LCD device are decreased.

SUMMARY

According to one aspect of the present disclosure, a display device includes an edge-lighting light source assembly, an LGP (light guide plate), a lower receiving container, a reinforcing member, a display panel and an upper receiving container. The light source assembly emits lights. The LGP guides the lights emitted from the light source assembly that is disposed at a first side surface thereof. The lower receiving container includes a bottom surface and a first sidewall to receive the light source assembly and the LGP. The lower receiving container includes a first coupling portion formed on the first bottom surface. The reinforcing member includes an elastic or flexible pressing down part structured and disposed for pressing down on an upper surface adjacent to a corner portion of the LGP and a more rigid fixing part integrally extending from an end portion of the pressing down part in parallel with a first sidewall of the lower receiving container to have a second coupling portion being coupled with the first coupling portion. The reinforcing member covers the light source assembly. The display panel is disposed above the LGP and the reinforcing member to display images using the lights exiting through the LGP. The upper receiving container covers an edge portion of the display panel. The upper receiving container includes a third coupling portion coupled to the first coupling portion and the second coupling portion through a coupling member.

In an example embodiment, the display device may further include a unitary mold frame disposed between the reinforcing member and the upper receiving container to surround an edge portion of the display panel.

In an example embodiment, the mold frame may include a stopper formed in adjacent to a light incident surface of the LGP facing the light source assembly to prevent that the LGP contacts with the light source assembly.

In an example embodiment, the display device may instead include separate side mold pieces each surrounding a respective corner of the display panel to fix the display panel. The side mold may be disposed in adjacent to a corner of the display panel where the reinforcing member is disposed thereon.

In an example embodiment, the reinforcing member may have a recess structured for guiding therethrough a flexible circuit cable or substrate which electrically connects the display panel with a driving substrate.

In an example embodiment, the first coupling portion may include a protrusion surface protruded with respect to the bottom surface, the second coupling portion may include a concave surface making contact with the protrusion surface, and the third coupling portion may include a concave portion connected to the protrusion surface and the concave surface. A first coupling hole may be formed through the protrusion surface, a second coupling hole may be formed through the concave surface, and a third coupling hole may be formed through the concave portion.

In an example embodiment, the display device may further include a mold frame disposed between the reinforcing member and the upper receiving container to surround an edge portion of the display panel. The mold frame may include a coupling hole coupled with the first, second and third coupling holes through the coupling member.

In an example embodiment, the pressing down part of the reinforcing member may include a reflective cover portion covering an upper portion of the light source assembly. The fixing part of the reinforcing member may include a reflection portion covering a side portion of the light source assembly opposite to a light incident surface of the LGP surface to reflect light leaked from the light source assembly toward the light incident surface of the LGP.

In an example embodiment, the reinforcing member may include a heat sinking and transferring away or radiating away material which absorbs, transfers away or radiates away heat generated from the light source assembly, for example by transferring the heat through the pressing down part and the fixing part.

In an example embodiment, the lower receiving container may include a pressing down plate extended from an end portion of a second sidewall opposite to a first sidewall of the lower receiving container adjacent to the reinforcing member toward an inner portion of the lower receiving container. The pressing down extension plate may press down on an upper surface adjacent to a corner of the LGP.

In an example embodiment, the lower receiving container may include a reinforcing portion that is extended from an edge portion of a third sidewall connected to a first sidewall of the lower receiving container adjacent to the reinforcing member to be extended toward an exterior portion or an interior portion of the lower receiving container.

In an example embodiment, a reinforcing portion of the lower receiving container may include a cross-sectional view having an L-shape.

In an example embodiment, the coupling member may be coupled with the first, second and third coupling portions and may be inserted into the display device using a front mounting method.

In an example embodiment, the display device may further include a cushion disposed between the reinforcing member and the display panel to support the display panel.

In an example embodiment, the reinforcing member may include for formation of the pressing down part, at least one selected from a group consisting of a material comprising aluminum, a material comprising magsium and an alloy material of a polycarbonate and a glass fiber.

In an example embodiment, a cross-sectional view of the reinforcing member may be an L-shape.

In an example embodiment, plural and respectively cooperating light source assemblies and reinforcing members may be provided.

In an example embodiment, the light source assembly may be disposed between the first side surface of the LGP and the coupling member.

In an example embodiment, the reinforcing member may further include a reflection member disposed at an inner portion thereof surrounding the light source assembly.

According to another aspect of the disclosure, a display device includes a light source assembly, an LGP, a lower receiving container, a reinforcing member, a display panel, an upper receiving container and a mold frame. The light source assembly emits lights. The LGP guides the lights emitted from the light source assembly that is disposed at a first side surface thereof. The lower receiving container includes a bottom surface and a first sidewall to receive the light source assembly and the LGP. The lower receiving container includes a first coupling portion formed on the first bottom surface. The reinforcing member includes a pressing down part pressing down on an upper surface adjacent to a corner portion of the LGP and a fixing part extending from an end portion of the pressing down part in parallel with a first sidewall of the lower receiving container to have a second coupling portion being coupled with the first coupling portion. The reinforcing member covers the light source assembly. The display panel is disposed on the LGP and the reinforcing member to display images using the lights exiting through the LGP. The upper receiving container covers an edge portion of the display panel. The upper receiving container includes a third coupling portion coupled to the first coupling portion and the second coupling portion through a coupling member. The mold frame is disposed between the reinforcing member and the upper receiving container to support the display panel.

According to some example embodiments, the display device includes the reinforcing member pressing down on the LGP and irradiating or otherwise transferring away heat that originated from the adjacent light source assembly and the coupling member coupling the reinforcing member to the lower receiving container is reflective, so that light efficiency may be increased and a stiffness of the display device may be enhanced. Thus, costs due to defects of the LGP and the display device may be decreased, and reliability and display quality of the display device may be enhanced.

BRIEF DESCRIPTION OF THE DRAWINGS

The above and other features and advantages of the present disclosure will become more apparent by describing in detailed example embodiments thereof with reference to the accompanying drawings, in which.

DETAILED DESCRIPTION

The present disclosure of invention is described more fully hereinafter with reference to the accompanying drawings, in which example embodiments are shown. The present teachings may, however, be embodied in many different forms and should not be construed as limited to the example embodiments set forth herein. Rather, these example embodiments are provided so that this disclosure will be thorough and complete, and will fully convey the scope of the present teachings to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present disclosure should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure of invention will be explained in detail with reference to the accompanying drawings.

Figure 1:
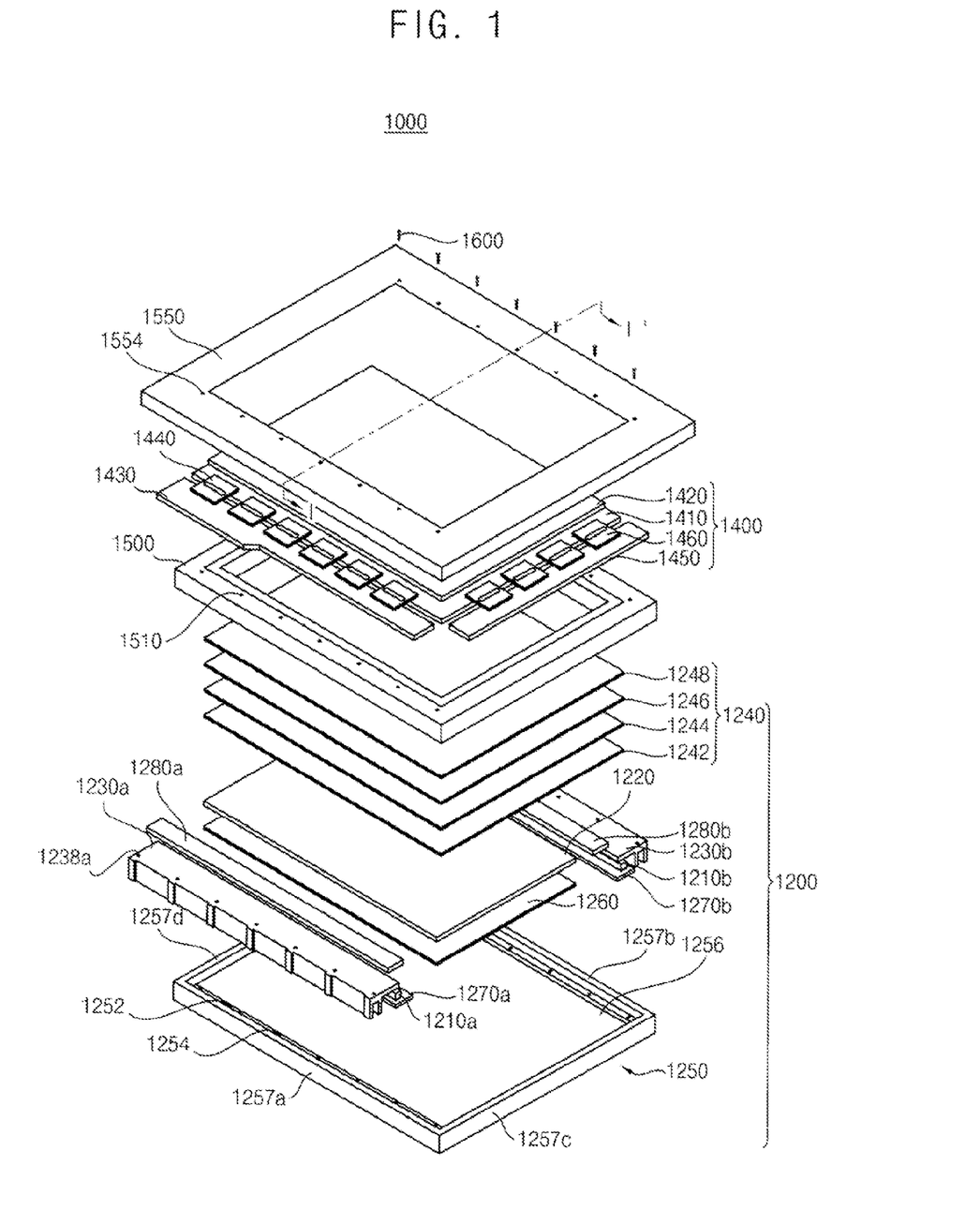
FIG. 1 is an exploded perspective view schematically illustrating a display device according to an embodiment.
Figure 2:
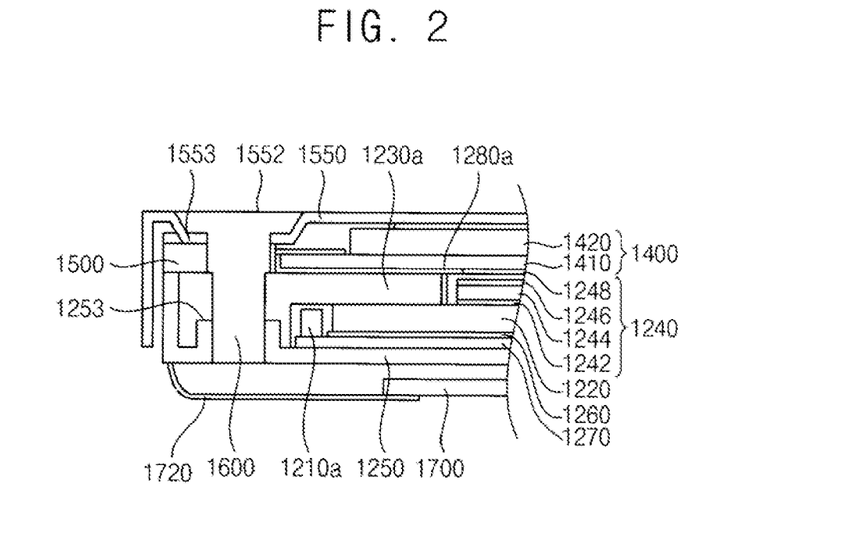
FIG. 2 is a cross-sectional taken along a line I-I' of FIG. 1.

FIG. 1 is an exploded perspective view schematically illustrating a display device 1000 according to an embodiment. FIG. 2 is a cross-sectional taken along a line I-I' of FIG. 1.

Referring to FIGS. 1 and 2, the display device 1000 includes a backlight assembly 1200, a display panel 1400, a mold frame 1500, an upper receiving container 1550 and a coupling member 1600.

The backlight assembly 1200 includes light source assemblies 1210a and 1210b, a light guide plate (LGP) 1220, a first reinforcing member 1230a, a second reinforcing member 1230b, optical sheets 1240, a lower receiving container 1250 and a reflection plate 1260. The number and locations of the reinforcing members (e.g., first and second RM's 1230a and 1230b) may correspond to the number and locations of edge light source assemblies (e.g., first and second light source assemblies 1210a and 1210b). More specifically, in the illustrated embodiment the number of edge-lighting source assemblies 1210a and 1210b is two and these are designed to be disposed at two opposed, light receiving sides (incident sides) of the LGP 1220. Alternatively, the number of edge-lighting source assemblies may be increased to four (e.g., 1210a, 1210b, 1210c, 1210d, not all shown) and these may be respectively disposed at a corresponding four light receiving sides of the LGP 1220. When the number of the light source assemblies 1210a and 1210b is two, the number of reinforcing members 1230a and 1230b may be two in accordance with the number of the light source assemblies 1210a and 1210b. Alternatively, when the number of light source assemblies 1210a and 1210b is four, the number of the reinforcing members 1230a and 1230b may be four in accordance with the number of the light source assemblies 1210a and 1210b.

The display device 1000 may be a slim type display device having an assembled panels thickness of about 5 mm. In this case, the thickness of the upper receiving container 1550 and the lower receiving container 1250 may be about 0.6 mm, respectively, and the thickness of the display panel 1400 may be about 1.85 mm.

The light source assemblies 1210a and 1210b emit edge lighting from their respective lights. For example, the light source assemblies 1210a and 1210b may include one of an elongated cold cathode fluorescent lamp (CCFL), a flat fluorescent lamp (FFL) and a plurality of light emitting diodes (LEDs). When the light source assemblies 1210a and 1210b include the LEDs, the display device 1000 may further include a light sources mounting substrate 1270 for mounting the LED or alike light source assemblies thereon.

As mentioned, the LGP 1220 has one or more light incident surfaces onto which lights from external light source assemblies (e.g., 1210a and 1210b) are incident and a light exiting surface from which guided lights are emitted for transmission as backlighting to overlying layers of the backlit display device. The light exiting surface may be provided adjacent to the light incident surface. The light source assemblies 1210a and 1210b are positioned adjacent to the light incident surfaces of the LGP 1220. The LGP 1220 may guide and redirect lights emitted from the light source assemblies 1210a and 1210b so the redirected lights exit toward the display panel 1400 through the light exiting surface of the LGP.

The lower receiving container 1250 has a bottom surface 1256, a first sidewall 1257a, a second sidewall 1257b, a third sidewall 1257c and a fourth sidewall 1257d that are integrally extended from the bottom surface 1256, so that the lower receiving container 1250 may receive and house the light source assemblies 1210a and 1210b, the LGP 1220, etc.

The first and second reinforcing members 1230a and 1230b may press down on a portion adjacent to a corner portion of the LGP 1220 to be connected to the lower receiving container 1250.

The first and second reinforcing members 1230a and 1230b press down on the LGP 1220, so that twisting and displacement of the LGP 1220 may be prevented and a gap between the first and second reinforcing members 1230a and 1230b and the LGP 1220 may be removed. Thus, lights that might otherwise leak from the LGP 1220, and which are generated from the light source assemblies 1210a and 1210b, assuredly enter the LGP 1220. That is, the first and second reinforcing members 1230a and 1230b may play a role of a conventional lamp cover which covers the light source assemblies 1210a and 1210b and together with the lower receiving container 1250 cooperates to reflect leaked light back into the LGP so that the leaked light is not wasted.

The first and second reinforcing members 1230a and 1230b may include a metal material and/or a non-metal material and these may be good reflectors of light. For example, the first and second reinforcing members 1230a and 1230b may include at least one of an aluminum material, a magsium material and an alloy material of a polycarbonate and a glass fiber.

Alternatively or additionally, the first and second reinforcing members 1230a and 1230b may include a heat conducting and radiating material. The first and second reinforcing members 1230a and 1230b may sink and radiate away heat generated from the light source assemblies 1210a and 1210b.

The optical sheets 1240 include a diffusion sheet 1242, a prism sheet 1244, a luminance enhancing sheet 1246 and a polarization sheet 1248.

The diffusion sheet 1242 diffuses lights emitted from the LGP 1220, and the prism sheet 1244 and the luminance enhancing sheet 1246 enhance a luminance of lights emitted from the diffusion sheet 1242. The polarization sheet 1248 may linearly polarize or circularly polarize lights emitted from the luminance enhancing sheet 1246 to provide the display panel 1400 with linearly polarized or circularly polarized lights.

The reflection plate 1260 reflects lights leaked from the LGP 1220 back toward the LGP 1220.

When the light source assemblies 1210a and 1210b are LEDs, the light source mounting substrate 1270 may mount the light source assemblies 1210a and 1210b to provide the light source assemblies 1210a and 1210b with electrical current for generating lights by the light source assemblies 1210a and 1210b.

The unitarily molded frame 1500 has a frame shape to support four edge portions of the display panel 1400. When assembled, the mold frame 1500 is disposed between the first and second reinforcing members 1230a and 1230b and the upper receiving container 1550 to thereby fill up an empty space otherwise present between the first and second reinforcing members 1230a and 1230b, so that a deforming contact between the upper receiving container 1550 and the display panel 1400 may be prevented.

Moreover, the mold frame 1500 supports the display panel 1400 to be combined with the first and second reinforcing members 1230a and 1230b, so that a light leakage of the display device 1000 may be prevented. In addition, it helps to prevent foreign substances (e.g., dust, manufacturing debris) from inflowing into sides of the display device 1000. A plurality of coupling holes 1510 into which respective coupling members 1600 (only one referenced) may be penetrated are formed through an edge portion of the mold frame 1500.

The display panel 1400 includes a thin-film transistors array substrate 1410 (TFT substrate), a color filters substrate 1420 (also otherwise referred to as the common electrode substrate) and a liquid crystal material layer (not shown) interposed between the thin-film transistor substrate 1410 and the color filter substrate 1420.

The display panel 1400 is disposed above the LGP 1200 and the first and second reinforcing members 1230a and 1230b to display an image by using lights emitted from the LGP 1200.

The thin film transistor substrate 1410 is connected to driving printed circuit substrates 1430 and 1450 which latter substrates include electronic components (e.g., integrated circuits) for driving the display panel 1400. In one embodiment, the driving substrates 1430 and 1450 include a gate lines driving substrate 1430 and a data lines driving substrate 1450.

A first (gate lines side) tape carrier package (TCP) 1440 is attached to the gate driving substrate 1430, and a second (data lines side) tape carrier package 1460 is attached to the data driving substrate 1450.

The gate TCP 1440 applies gate line signals to the display panel 1400, and the data tape carrier package 1460 applies data line signal to the display panel 1400.

According to one embodiment, the gate driving substrate 1430 may be removed from the display panel 1400 and the gate lines driving electronics may be directly mounted on the display panel 1400. Moreover, the gate TCP 1440 is omitted and a gate circuit may be directly monolithically integrated on the display panel 1400.

The upper receiving container 1550 covers edge portions of the display panel 1400 to receive the display panel 1400 by coupling with the lower receiving container 1250 by use for example of the coupling members 1600 extending from the upper receiving container 1550 down to the lower receiving container 1250 and providing fastening therebetween.

More specifically, the coupling members 1600 may couple together the upper receiving container 1550, the mold frame 1500, the first and second reinforcing members 1230a and 1230b and the lower receiving container 1250. For example, the coupling member 1600 may be a bolt, screw, rivet or other fastening means. The coupling member 1600 may be coupled to the upper receiving container 1550, the mold frame 1500, the first and second reinforcing members 1230a and 1230b and the lower receiving container 1250 in a front mounting type of style (e.g., screwed in from the top) and distributed along a peripheral edge portion of the upper receiving container 1550 so as to pass behind or between the light source assemblies 1210a and 1210b. That is, when the light source assemblies 1210a and 1210b are positioned between a first side surface of the LGP 1220 and the coupling member 1600 so that a direction in which the light source assemblies 1210a and 1210b face the LGP 1220 is defined as a front direction, the coupling members 1600 may be positioned at a rear of the light source assemblies 1210a and 1210b (behind the light source assemblies).

Thus, the coupling members 1600 may provide a reinforcing function and prevent shaking or trembling of components included in the display device 1000, and may enhance a stiffness of the display device 1000 in a whole.

The display device 1000 may further include cushions (resilient dampeners) 1280a and 1280b disposed on the first and second reinforcing members 1230a and 1230b.

The cushions 1280a and 1280b are disposed between the first and second reinforcing members 1230a and 1230b and the display panel 1400 to support the display panel 1400. The cushions 1280a and 1280b may prevent the display panel 1400 from being damaged due to a direct contact between the first and second reinforcing members 1230a and 1230b and the display panel 1400. For example, the cushions 1280a and 1280b may include a rubber like material.

Moreover, the lower receiving container 1250 has a first coupling portion 1252 formed on the bottom surface 1256 thereof. The first coupling portion 1252 may be strongly coupled with (e.g., threaded with) the coupling member 1600. The first coupling portion 1252 includes a protrusion surface 1253 that is protruded from the bottom surface 1256 in order to prevent the thickness of the display device 1000 from increasing due to the coupling member 1600. A first coupling hole 1254 is formed through the protrusion surface 1253.

When the coupling member 1600 is a bolt or screw, a diameter of the bolt/screw may be about 20 mm. In this case, a threaded nut means having a thickness of about 1.2 mm may be required to couple to the bolt operated as the coupling member 1600.

In order to form the threaded nut means in the lower receiving container 1250, a surface may be formed, which is protruded from a bottom surface 1256 of the lower receiving container 1250 toward an outside of the lower receiving container 1250. However, the thickness of the display device 1000 may be increased with this approach.

Thus, as shown in FIGS. 1 and 2, the lower receiving container 1250 may have a threaded protrusion surface 1253 that is protruded from the bottom surface 1256 toward an inner space of the lower receiving container 1250. In addition, a height of the protrusion surface 1253 may be no less than about 1.2 mm.

Figure 3A:
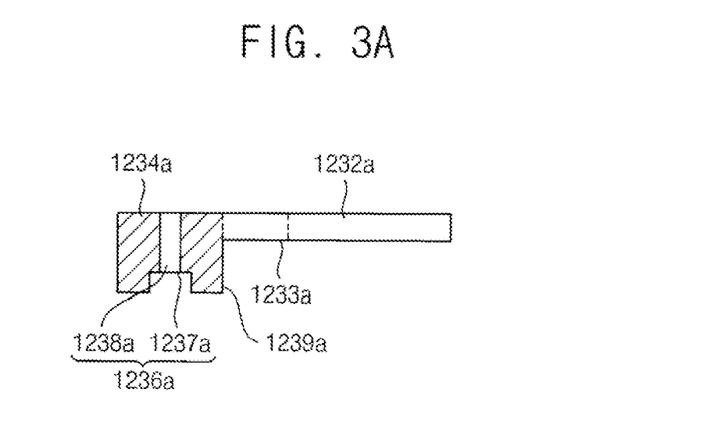
FIG. 3A is a cross-sectional view schematically illustrating the first reinforcing member on a plan view of FIG. 1.
Figure 3B:
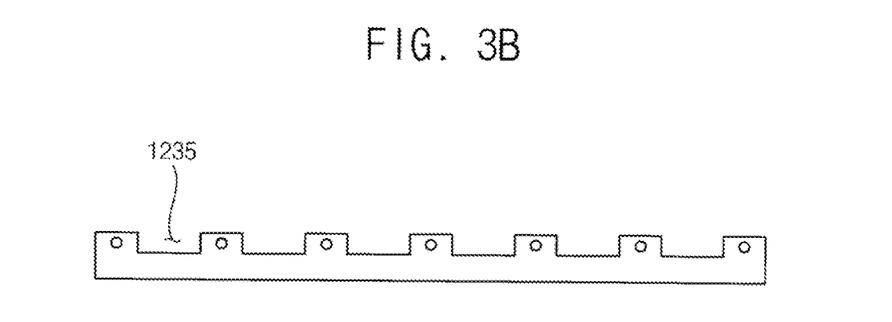
FIG. 3B is a cross-sectional view schematically illustrating the second reinforcing member on a plan view of FIG. 1.

FIG. 3A is a cross-sectional view schematically illustrating the first reinforcing member 1230a on a plan view of FIG. 1. FIG. 3B is a cross-sectional view schematically illustrating the second reinforcing member 1230a on a plan view of FIG. 1.

Referring to FIGS. 1, 2, 3A and 3B, the first reinforcing member 1230a includes a pressing down part 1232a and a fixing part 1234a.

The fixing part 1234a includes a second coupling portion 1236a extending in parallel with a first sidewall 1257a of the lower receiving container 1250. The second coupling portion 1236a has a depressed surface 1237a formed thereon. A second coupling hole 1238a is formed through the depressed surface 1237a so that the coupling member 1600 can penetrate through the depressed surface 1237a.

The pressing down part 1232a suppresses (presses down on) an upper surface adjacent to a corner portion of the LGP 1220. The first reinforcing member 1230a suppresses the LGP 1220 using the pressing down part 1232a, so that a gap between the first reinforcing member 1230a and the LGP 1220 may be removed. Thus, it is reduced or prevented that lights generated from the light source assembly 1210a is leaked to an outside of the LGP 1220.

The second coupling portion 1236a is extended from an end portion of the pressing down part 1232a to be coupled with a first coupling portion 1252 of the lower receiving container 1250.

For example, the second coupling portion 1236a has a depressed surface 1237a contacting with the protrusion surface 1253 included in the first coupling portion 1252 of the lower receiving container 1250. The depressed surface 1237a contacts with the lower receiving container 1250 in a shape conformably surrounding an outside of the protrusion surface 1253.

Thus, when the first reinforcing member 1230a and the lower receiving container 1250 are coupled with each other, the depressed surface 1237a may guide the first reinforcing member 1230a to alignably mate with the lower receiving container 1250. In addition, the depressed surface 1237a may prevent lights from leaking to an outside of the display device 1000 and a foreign substance from infiltrating into the display device 1000.

Moreover, the pressing down part 1232a includes a reflective light source covering part 1233a covering an upper surface of the light source assembly (e.g., LED) 1210a. The fixing part 1234a has a reflection portion 1239a which covers a side surface of the light source assembly 1210a opposite to an incident surface of the LGP 1220 to reflect light leaked from the light source assembly 1210a toward the light incident surface of the LGP 1220.

Furthermore, the first reinforcing member 1230a may further include a reflection member reflecting lights, which is disposed in an inner surface surrounding the light source assembly 1210a.

The first reinforcing member 1230a may include a reflective metal material or a non-metal material. For example, the first reinforcing members 1230a and 1230b may include at least one of an aluminum material, a magsium material and an alloy material of a polycarbonate and a glass fiber.

Moreover, the first reinforcing member 1230a may include a heat sinking and radiating material having a small deformation due to a thermal expansion and capable of sinking and radiating away heat.

The pressing down part 1232a of the first reinforcing member 1230a faces an upper surface of the light source assembly 1210a and the fixing part 1234a of the first reinforcement faces a side surface of the light source assembly 1210a, so that heat generated from the light source assembly 1210a may be absorbed, conducted away and irradiated or otherwise output to an exterior portion of the display device due to the heat transfer characteristics of the pressing down part 1232a and the fixing part 1234a.

Thus, the first reinforcing member 1230a may prevent the LGP 1220 from being deformed due to build up of heat generated from the light source assembly 1210a. In addition, the first reinforcing member 1230a may prevent an alignment between the light source assembly 1210a and an incident light portion of the LGP 1220 from being deviated.

A cross-sectional view of the first reinforcing member 1230a is an L-shape in a whole as seen for example in FIG. 3A.

Generally, a signals source substrate 1700 (shown in FIG. 2) is disposed in the display device 1000, which generates a plurality of control signals which will be provided to the display device 1000. A flexible circuit substrate (flat cable) 1720 is disposed below a lower substrate of the source substrate 1700, which is electrically connected to the source substrate 1700 and the display panel 1400 to provide the display panel 1400 with the control signals.

The first reinforcing member 1230a has a recess 1235 (shown in FIG. 3B) into which the flexible circuit substrate 1720 is guided to pass therethrough.

Figure 4A:
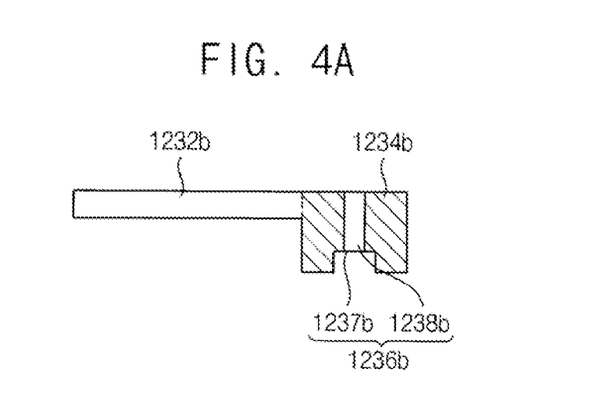
FIG. 4A is a cross-sectional view schematically illustrating the second reinforcing member on a side view of FIG. 1.
Figure 4B:
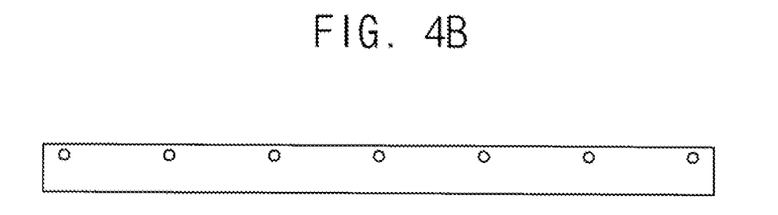
FIG. 4B is a cross-sectional view schematically illustrating the second reinforcing member on a plan view of FIG. 1.

FIG. 4A is a cross-sectional view schematically illustrating the second reinforcing member 1230b on a side view of FIG. 1. FIG. 4B is a cross-sectional view schematically illustrating the second reinforcing member 1230b on a plan view of FIG. 1.

Referring to FIGS. 4A and 4B, a cross-sectional view of the second reinforcing member 1230b is a substantially L-shape when viewed on a side surface thereof, and a cross-sectional view of the second reinforcing member 1230b is a substantially rectangular shape when viewed on a plan view thereof.

When four surfaces of the display device 1000 are defined as an upper surface, a lower surface opposite to the upper surface, a left surface perpendicular to the upper and lower surfaces and a right surface opposite to the left surface, the first reinforcing member 1230a as shown in FIGS. 3A and 3B is disposed at an edge portion of the upper surface. Also, the second reinforcing member 1230b as shown in FIGS. 4A and 4B is disposed at an edge portion of the lower surface.

Since a flexible circuit substrate is not connected toward the display panel 1400 corresponding to the lower surface, the second reinforcing member 1230*b* as shown in FIGS. 4A and 4B does not have one or more recesses for letting through the flex cable in comparison with the first reinforcing member 1230*a* having recesses 1235 as shown in FIGS. 3A and 3B.

The second reinforcing member 1230*a* as shown in FIGS. 4A and 4B also includes a pressing down part 1232*b* and a fixing part 1234*b*. The fixing part 1234*b* includes a second coupling portion 1236*b* in parallel with the second sidewall 1256*b* of the lower receiving container 1250, and the second coupling portion 1236*b* includes a depressed surface 1237*b*. A second coupling hole 1238*b* is formed through the depressed surface 1237*b* so that the coupling member 1600 penetrates the depressed surface 1237*b*.

The pressing down part 1232*a* suppresses an upper surface adjacent to a corner portion of the LGP 1220. The second reinforcing member 1230*b* suppresses the LGP 1220 using the pressing down part 1232*a*, so that a gap between the second reinforcing member 1230*b* and the LGP 1220 may be removed. Thus, it is prevented that lights generated from the light source assembly 1210*a* is leaked to an outside of the LGP 1220.

A whole shape of each of the first and second reinforcing members 1230*a* and 1230*b* may be manufactured through an extruding process, and the second coupling holes 1238*a* and 1238*b* in which the coupling members 1600 are penetrated therethrough may be manufactured through a pressing process or a drilling process.

Referring to again FIGS. 1 and 2, the upper receiving container 1550 includes a third coupling portion 1552 that is coupled with the first coupling portion 1252 of the lower receiving container 1250 and the second coupling portions 1236*a* and 1236*b* of the first and second reinforcing members 1230*a* and 1230*b*.

The third coupling portion 1552 includes a beveled or concave portion 1553 (seen in FIG. 2) in correspondence with a beveled head thickness of the coupling member 1600 in order to prevent a thickness of the display device 1000 from being increased due to protrusion of the coupling member 1600. A third coupling hole 1554 is formed through the concave portion 1553 so that the third coupling hole 1554 is penetrated through the concave portion 1553.

Figure 5:
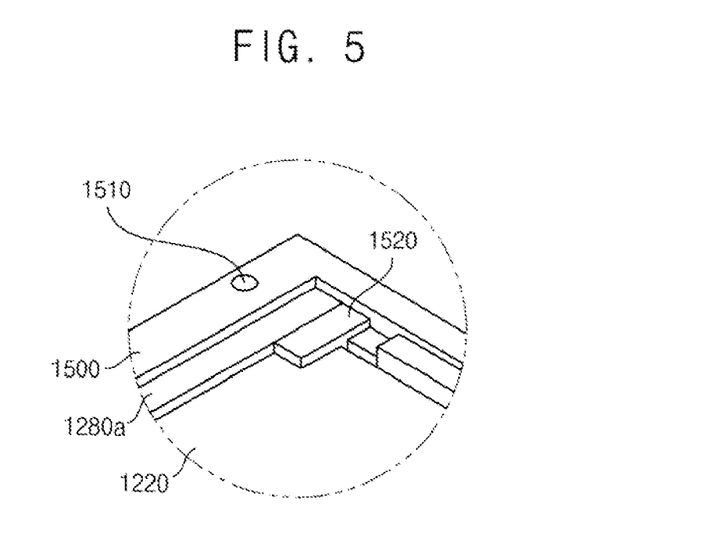
FIG. 5 is an enlarged perspective view schematically illustrating a mold frame of FIG. 1.

FIG. 5 is an enlarged perspective view schematically illustrating a mold frame of FIG. 1.

Referring to FIG. 5, the mold frame 1500 has a corner stopper 1520. The stopper 1520 is formed at a sidewall of the mold frame 1500 adjacent to a light incident surface of the LGP 1220 opposing the light source assembly 1510*a*. The stopper 1520 may prevent the LGP 1220 from making direct contact with the light source assembly 1210*a*. That is, the stopper 1520 may prevent a damage of the light source assembly 1510*a* due to the LGP 1220 hitting it.

Therefore, the display device 1000 according to a first embodiment of the present disclosure includes the first and second reinforcing members 1230*a* and 1230*b* to prevent a damage of the LGP 1220. Moreover, the coupling member 1600 may couple the first and second reinforcing members 1230*a* and 1230*b* to the lower receiving container 1250, so that a stiffness of the display device 1000 may be enhanced.

Figure 6:
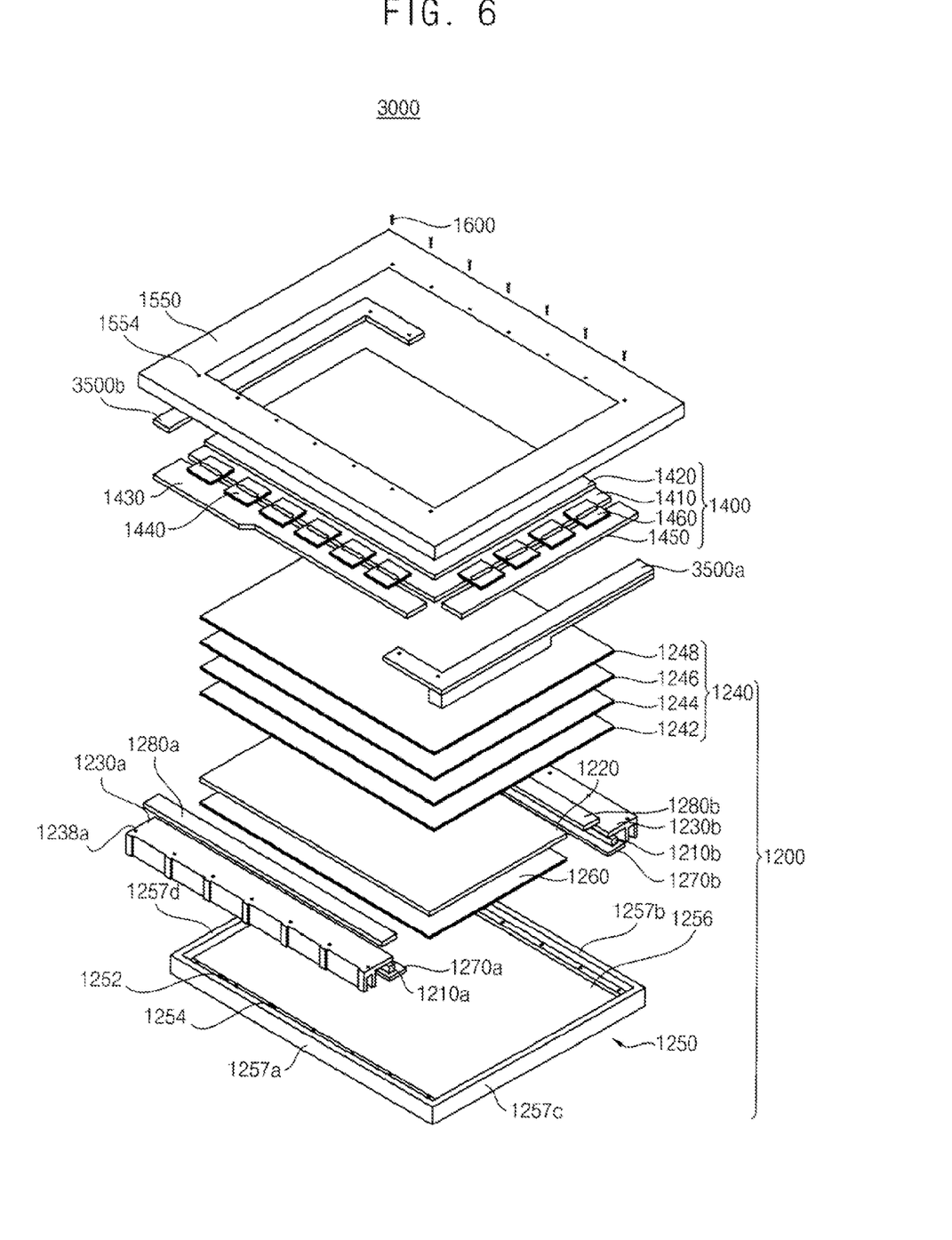
FIG. 6 is an exploded perspective view schematically illustrating a display device according to another embodiment.

FIG. 6 is an exploded perspective view schematically illustrating a display device 3000 according to another embodiment.

The display device 3000 of FIG. 6 is substantially the same as the display device 1000 of FIGS. 1 and 2 except that the display device 3000 includes side mold pieces 3500*a* and 3500*b* in replace of the unitary mold frame 1500. Thus, the same reference numerals will be used to refer to the same or like parts as those described in FIGS. 1 and 2 and any further explanation concerning the above elements will be omitted.

Referring to FIG. 6, the display device 3000 includes a backlight assembly 1200, a display panel 1400, side molds 3500*a* and 3500*b*, an upper receiving container 1550 and a coupling member 1600.

The backlight assembly 1200 includes light source assemblies 1210*a* and 1210*b*, an LGP 1220, a first reinforcing member 1230*a*, a second reinforcing member 1230*b*, optical sheets 1240, a lower receiving container 1250 and a reflection plate 1260.

The light source assemblies 1210*a* and 1210*b* emit lights. The LGP 1220 has a light incident surface in which lights are incident into the LGP 1220 and a light exiting surface in which lights exit from the LGP 1220. The light exiting surface is adjacent to the light incident surface. The light source assemblies 1210*a* and 1210*b* are positioned at the light incident surface of the LGP 1220. The LGP 1220 guides lights generated from the light source assemblies 1210*a* and 1210*b* to exit toward the display panel 1400 through the light exiting surface.

The lower receiving container 1250 has a bottom surface 1256, a first sidewall 1257*a*, a second sidewall 1257*b*, a third sidewall 1257*c* and a fourth sidewall 1257*d* that are extended from the bottom surface 1256, so that the lower receiving container 1250 may receive the light source assemblies 1210*a* and 1210*b*, the LGP 1220, etc.

The first and second reinforcing members 1230*a* and 1230*b* press down on a portion adjacent to a corner of the LGP 1220 to be connected to the lower receiving container 1250.

Since the first and second reinforcing members 1230*a* and 1230*b* press down on the LGP 1220, so that torsion and come off of the LGP 1220 may be prevented and a gap between the first and second reinforcing members 1230*a* and 1230*b* and the LGP 1220 may be removed. Thus, lights leaked from the LGP 1220, which are generated from the light source assemblies 1210*a* and 1210*b*, enter the LGP 1220. That is, the first and second reinforcing members 1230*a* and 1230*b* may play a role of a conventional lamp cover together with the lower receiving container 1250.

The first and second reinforcing members 1230*a* and 1230*b* may include a metal material or a non-metal material. For example, the first and second reinforcing members 1230*a* and 1230*b* may include at least one of an aluminum material, a magsium material and an alloy material of a polycarbonate and a glass fiber.

Alternatively, the first and second reinforcing members 1230*a* and 1230*b* may include a heat radiating material. The first and second reinforcing members 1230*a* and 1230*b* may radiate heat generated from the light source assemblies 1210*a* and 1210*b*.

The optical sheets 1240 include a diffusion sheet 1242, a prism sheet 1244, a luminance enhancing sheet 1246 and a polarization sheet 1248.

The reflection plate 1260 reflects light leaked from the LGP 1220 toward the LGP 1220.

When the light source assemblies 1210*a* and 1210*b* are LEDs, the display device 3000 may further include a light source mounting substrate 1270. The light source assemblies 1210*a* and 1210*b* are mounted on the light source mounting substrate 1270. The light source mounting substrate 1270 provides the light source assemblies 1210*a* and 1210*b* with current for generating lights.

The separate side molds 3500*a* and 3500*b* surround corners opposite to each other of edge portions of the display panel. For example, the side molds 3500*a* and 3500*b* are respectively disposed at edge potions of the display panel 1400 where the display panel 1400 is not supported by the first and second reinforcing members 1230a and 1230b, so that the side molds 3500a and 3500b may support and fix the display panel 1400.

That is, the first and second reinforcing members 1230a and 1230b and the side molds 3500a and 3500b in replace of the mold frame 1500 of FIG. 1, surround the display panel 1400 to support and fix the display panel 1400.

The display panel 1400 includes a thin-film transistor substrate 1410, a color filter substrate 1420 and a liquid crystal layer (not shown) interposed between the thin-film transistor substrate 1410 and the color filter substrate 1420.

The display panel 1400 is disposed on the LGP 1200 and the first and second reinforcing members 1230a and 1230b to display images by using light exited from the LGP 1200.

The thin-film transistor substrate 1410 is connected to driving substrates 1430 and 1450 for driving the display panel 1400. The driving substrates 1430 and 1450 include a gate driving substrate 1430 and a data driving substrate 1450.

A gate tape carrier package 1440 is attached to the gate driving substrate 1430, and a data tape carrier package 1460 is attached to the data driving substrate 1450.

The upper receiving container 1550 is coupled to the lower receiving container 1250 to receive the display panel 1400. The coupling member 1600 may couple the upper receiving container 1500, the side molds 3500a and 2500b, the first and second reinforcing members 1230a and 1230b and the lower receiving container 1250 with each other.

The display device 3000 may further include cushions 1280a and 1280b for supporting the display panel 1400. The cushions 1280a and 1280b are disposed on the first and second reinforcing members 1230a and 1230b, respectively, to support the display panel 1400.

Figure 7:
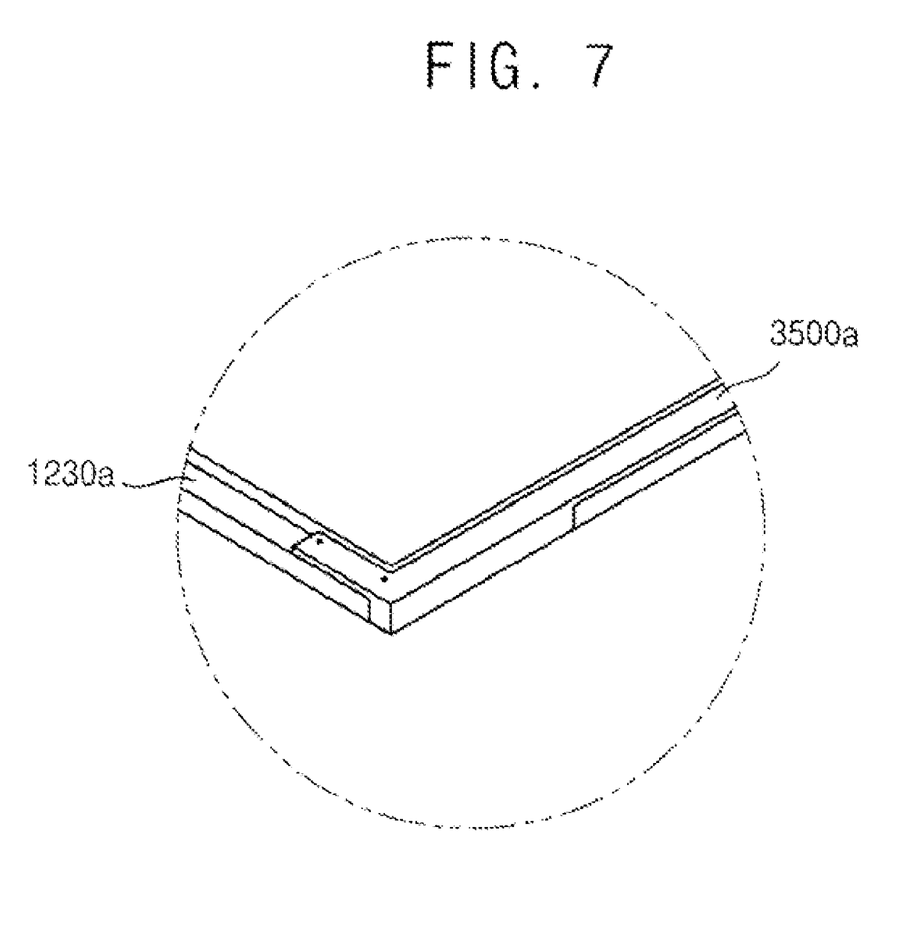
FIG. 7 is an enlarged perspective view schematically illustrating the side mold of FIG. 6.

FIG. 7 is an enlarged perspective view schematically illustrating one of the split side molds of FIG. 6.

Referring to FIGS. 6 and 7, when four surfaces of the display device 3000 are defined as an upper surface connected to the gate driving substrate 1430, a lower surface opposite to the upper surface, a left surface perpendicular to the upper and lower surfaces to be connected to the data driving substrate 1450 and a right surface opposite to the left surface, the side molds 3500a and 3500b are disposed at an edge portion of the display panel 1400 adjacent to the left surface and the right surface.

That is, the side molds 3500a and 3500b are respectively disposed at edge potions of the display panel 1400 where the display panel 1400 is not supported by the first and second reinforcing members 1230a and 1230b, so that the side molds 3500a and 3500b may support and fix the display panel 1400.

Thus, the display device 3000 may use the side molds surrounding two edge portions of the display panel 1400 in replace of a unitary mold frame surrounding four edge portions of the display panel 1400, so that manufacturing costs of the display device may be reduced.

Figure 8:
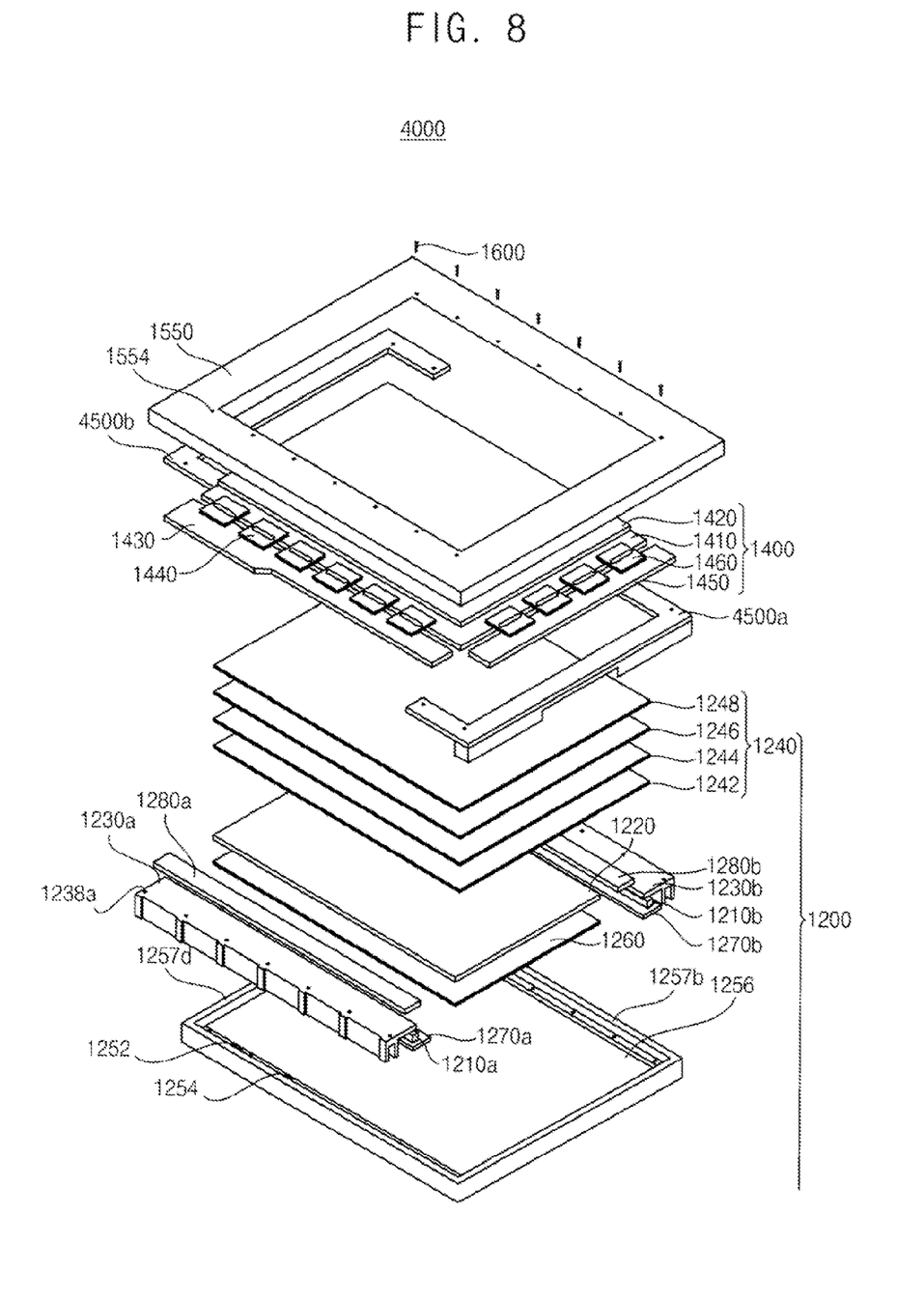
FIG. 8 is a cross-sectional view schematically illustrating a display device according to another embodiment.

FIG. 8 is a cross-sectional view schematically illustrating a display device 4000 according to another embodiment.

The display device 4000 of FIG. 8 is substantially the same as the display device 3000 of FIG. 6 except for the U-shaped side molds 4500a and 4500b. Thus, the same reference numerals will be used to refer to the same or like parts as those described in FIG. 6 and any further explanation concerning the above elements will be omitted.

Referring to FIG. 8, the display device 4000 includes a backlight assembly 1200, a display panel 1400, side molds 4500a and 4500b, an upper receiving container 1550 and a coupling member 1600.

The side molds 4500a and 4500b may have a U-shape for enhancing a coupling reliability with the display panel 1400 in comparison with the side molds 3500a and 3500b as shown in FIG. 6.

Figure 9:
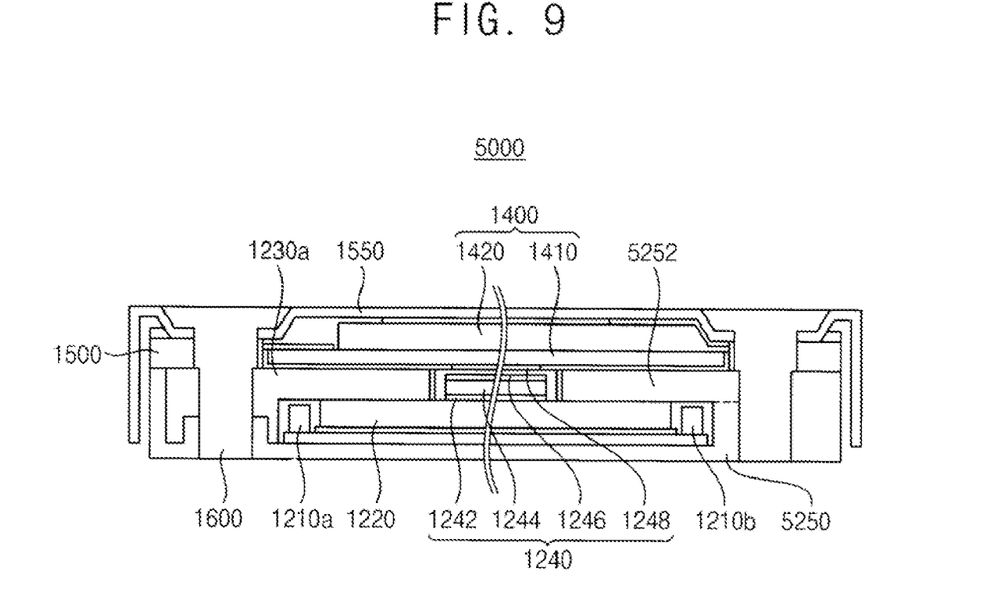
FIG. 9 is a cross-sectional view schematically illustrating a display device according to another embodiment.

FIG. 9 is a cross-sectional view schematically illustrating a display device 5000 according to another embodiment.

The display device 5000 of FIG. 9 is substantially the same as the display device 1000 of FIGS. 1 and 2 except for at least that the display device 5000 has not the second reinforcing member 1230b and a shape of the lower receiving container is altered in comparison with the display device 1000 of FIGS. 1 and 2. Thus, the same reference numerals will be used to refer to the same or like parts as those described in FIGS. 1 and 2 and any further explanation concerning the above elements will be omitted.

Referring to FIG. 9, the display device 5000 includes light source assemblies 1210a and 1210b, an LGP 1220, a first reinforcing member 1230a, optical sheets 1240, a lower receiving container 5250, a reflection plate 1260, a light source mounting substrate 1270, a display panel 1400, a mold frame 1500, an upper receiving container 1550 and a coupling member 1600.

The light source assemblies 1210a and 1210b emit lights. The LGP 1220 is positioned at sides of the light source assemblies 1210a and 1210b to guide lights generated from the light source assemblies 1210a and 1210b toward the display panel 1400.

The first reinforcing member 1230a suppresses a portion adjacent to a corner of the LGP 1220 to be connected to the lower receiving container 5250.

The first reinforcing member 1230a suppresses the LGP 1220, so that torsion and come off of the LGP 1220 may be prevented and a gap between the first reinforcing member 1230a and the LGP 1220 may be removed. Thus, lights leaked from the LGP 1220, which are generated from the light source assembly 1210a, are incident to the LGP 1220. That is, the first reinforcing member 1230a may play a role of a conventional lamp cover together with the lower receiving container 5250.

The first reinforcing member 1230a may include a metal material, a non-metal material and/or a heat radiating material. The first reinforcing member 1230 may sink and transfer away (e.g., by radiating away) heat generated from the light source assembly 1210a.

The optical sheets 1240 include a diffusion sheet 1242, a prism sheet 1244, a luminance enhancing sheet 1246 and a polarizing sheet 1248.

The reflection plate 1260 is disposed below the LGP 1220 to reflect lights leaked from the LGP 1220 toward the LGP 1220.

The light source mounting substrate 1270 may mount the light source assemblies 1210a and 1210b to provide current for generating lights with the light source assemblies 1210a and 1210b.

The lower receiving container 5250 includes a pressing down plate 5252 that is extended from an end portion of the second sidewall opposite to a first sidewall of the lower receiving container 5250 adjacent to the first reinforcing member 1230a toward an interior portion of the lower receiving container 5250 to be formed in an U-shape. The pressing down plate 5252 suppresses an upper surface adjacent to a corner of the LGP 1220.

For example, when the first reinforcing member 1230a is disposed on an upper portion of edge portions of the display device 5000, a sidewall of the lower receiving container 5250 adjacent to a lower of the edge portion is formed in an U-shape so that the first reinforcing member 1230a suppresses an upper surface adjacent to a corner of the LGP 1220 opposite to the first reinforcing member 1230*a* by the pressing down plate 5252.

The pressing down plate 5252 of the lower receiving container 5250 suppresses the LGP 1220, so that torsion and come off of the LGP 1220 may be prevented.

The display panel 1400 includes a thin-film transistor substrate 1410, a color filter substrate 1420 and a liquid crystal layer (not shown) interposed between the thin-film transistor substrate 1410 and the color filter substrate 1420.

The mold frame 1500 has a frame shape to support four edge portions of the display panel 1400. The mold frame 1500 is disposed between the first reinforcing members 1230*a* and the upper receiving container 1550, and between the lower receiving container 5250 and the upper receiving container 1550 to fill up an empty space between the first reinforcing members 1230*a* and the upper receiving container 1550, and an empty space between the lower receiving container 5250 and the upper receiving container 1550, so that a contact between the upper receiving container 1550 and the display panel 1400 may be prevented.

The upper receiving container 1550 covers an edge portion of the display panel 1400 to be combined with the lower receiving container 5250 to receive the display panel 1400. The coupling member 1600 may couple the upper receiving container 1500, the mold frame 1500, the first reinforcing member 1230*a* and the lower receiving container 5250 with each other.

Figure 10:
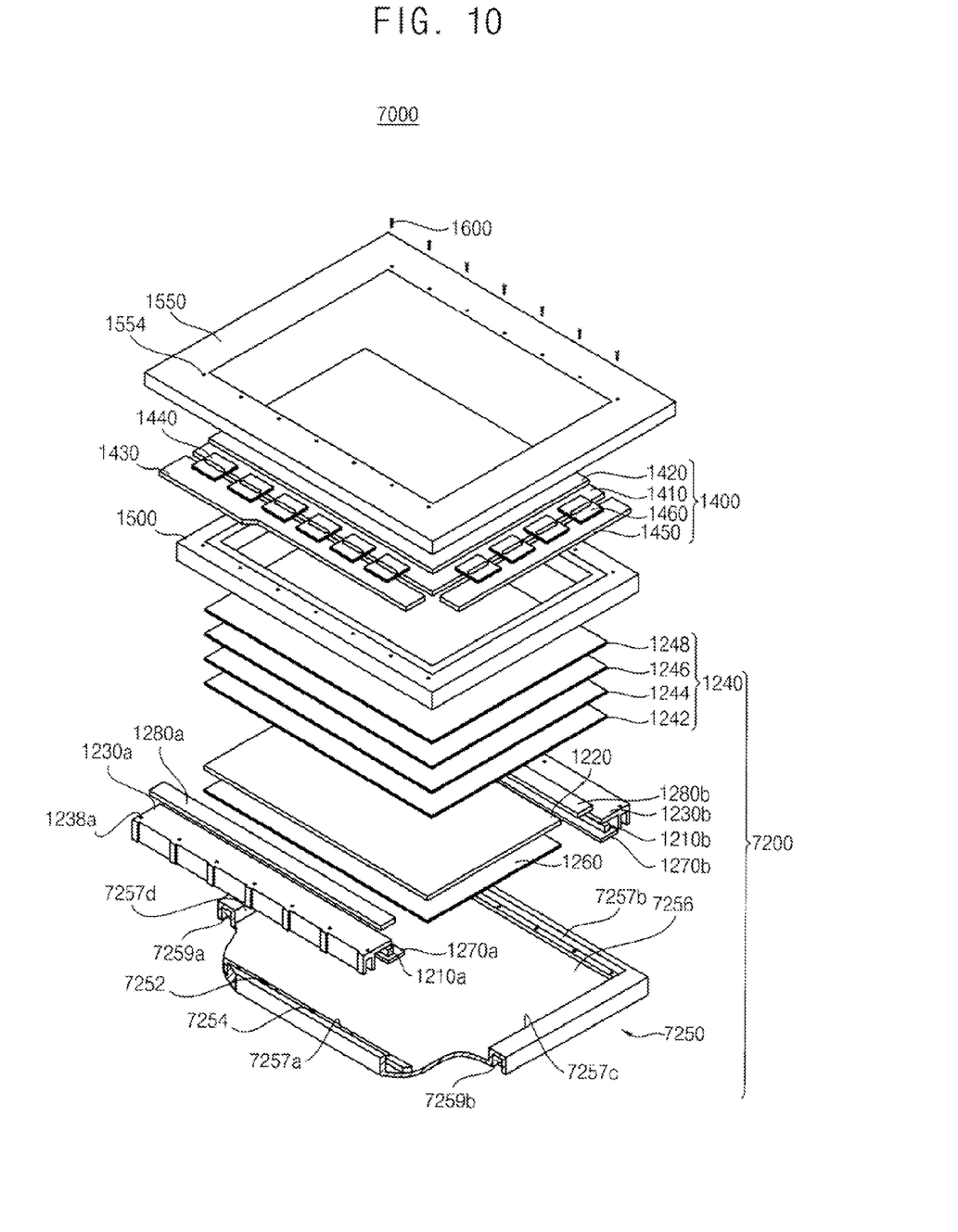
FIG. 10 is an exploded perspective view schematically illustrating a display device according to another embodiment.

FIG. 10 is an exploded perspective view schematically illustrating a display device 7000 according to another embodiment.

The display device 7000 of FIG. 10 is substantially the same as the display device 1000 of FIGS. 1 and 2 except for at least that a shape of the lower receiving container is altered in comparison with the display device 1000 of FIGS. 1 and 2. Thus, the same reference numerals will be used to refer to the same or like parts as those described in FIG. 6 and any further explanation concerning the above elements will be omitted.

Referring to FIG. 10, the display device 7000 includes a backlight assembly 7200, a display panel 1400, a mold frame 1500, an upper receiving container 7550 and a coupling member 1600.

The backlight assembly 1200 includes light source assemblies 1210*a* and 1210*b*, an LGP 1220, a first reinforcing member 1230*a*, a second reinforcing member 1230*b*, optical sheets 1240, a lower receiving container 1250 and a reflection plate 1260.

The light source assemblies 1210*a* and 1210*b* emit lights. The LGP 1220 is positioned at sides of the light source assemblies 1210*a* and 1210*b* to guide lights generated from the light source assemblies 1210*a* and 1210*b* toward the display panel 1400.

The lower receiving container 7250 has a bottom surface 7256, a first sidewall 7257*a*, a second sidewall 7257*b*, a third sidewall 7257*c* and a fourth sidewall 7257*d* that are extended from the bottom surface 7256, so that the lower receiving container 7250 may receive the light source assemblies 1210*a* and 1210*b*, the LGP 1220, etc.

Moreover, the lower receiving container 7250 includes a first reinforcing portion 7259*a* that is extended from an end portion of the third sidewall 7257*c* connected to the first sidewall 7257*a* of the lower receiving container 7250 adjacent to the first reinforcing member 1230*a* toward an exterior portion of the lower receiving container 7250, so that the first reinforcing portion 7259*a* has a cross-sectional view of an L-shape.

Moreover, the lower receiving container 7250 further includes a second reinforcing portion 7259*b* that is extended from an end portion of the fourth sidewall 7257*d* connected to the second sidewall 7257*b* of the lower receiving container 7250 adjacent to the second reinforcing member 1230*b* toward an exterior portion of the lower receiving container 7250, so that the second reinforcing portion 7259*b* has a cross-sectional view of an L-shape.

The first and second reinforcing portion 7259*a* and 7259*b* formed on the lower receiving container 7270 may prevent that the display device 7000 is bent in a vertical direction thereof, that is, a length direction in which the first and second reinforcing portions 7259*a* and 7259*b* are formed.

The first and second reinforcing members 1230*a* and 1230*b* press down on a portion adjacent to a corner of the LGP 1220 to be connected to the lower receiving container 7250.

Since the first and second reinforcing members 1230*a* and 1230*b* press down on the LGP 1220, so that torsion and come off of the LGP 1220 may be prevented and a gap between the first and second reinforcing members 1230*a* and 1230*b* and the LGP 1220 may be removed. Thus, lights leaked from the LGP 1220, which are generated from the light source assemblies 1210*a* and 1210*b*, are incident to the LGP 1220. That is, the first and second reinforcing members 1230*a* and 1230*b* may play a role of a conventional lamp cover together with the lower receiving container 1250.

The first and second reinforcing members 1230*a* and 1230*b* may include a metal material or a non-metal material. For example, the first and second reinforcing members 1230*a* and 1230*b* may include at least one of an aluminum material, a magsium material and an alloy material of a polycarbonate and a glass fiber.

Alternatively, the first and second reinforcing members 1230*a* and 1230*b* may include a heat radiating material. The first and second reinforcing members 1230*a* and 1230*b* may radiate heat generated from the light source assemblies 1210*a* and 1210*b*.

The optical sheets 1240 include a diffusion sheet 1242, a prism sheet 1244, a luminance enhancing sheet 1246 and a polarization sheet 1248.

The reflection plate 1260 reflects leakage light from the LGP 1220 toward the light guise plate 1220.

The upper receiving container 7550 covers an edge portion of the display panel 1400 to be combined with the lower receiving container 7250 to receive the display panel 1400. The coupling member 1600 may couple the upper receiving container 7500, the mold frame 1500, the first and second reinforcement members 1230*a* and 1230*b* and the lower receiving container 7250 with each other.

The display device 7000 may further include cushions 1280*a* and 1280*b* for supporting the display panel 1400. The cushions 1280*a* and 1280*b* are disposed on the first and second reinforcing members 1230*a* and 1230*b*, respectively, to support the display panel 1400.

Figure 11:
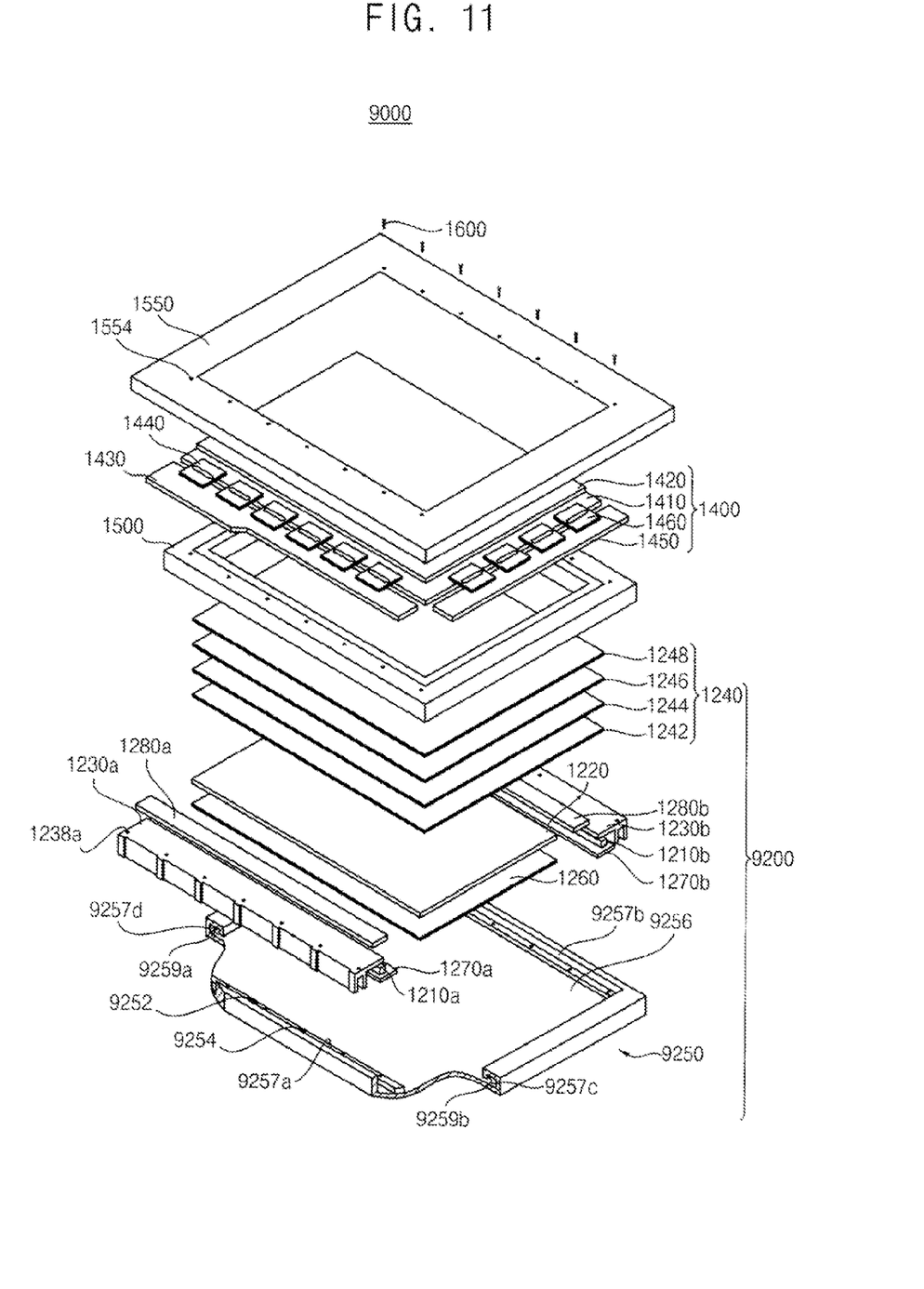
FIG. 11 is an exploded perspective view schematically illustrating a display device according to another embodiment.

FIG. 11 is an exploded perspective view schematically illustrating a display device 9000 according to another embodiment. The display device 9000 of FIG. 11 is substantially the same as the display device of FIG. 10 except for at least a lower receiving container. Thus, the same reference numerals will be used to refer to the same or like parts as those described in FIG. 10 and any further explanation concerning the above elements will be omitted.

Referring to FIG. 11, the display device 9000 includes a lower receiving container 9250. The lower receiving container 9250 includes a bottom surface 9256, a first sidewall 9257*a*, a second sidewall 9257*b*, a third sidewall 9257*c* and a fourth sidewall 9257*d*. The first to fourth sidewalls 9257*a*, 9257*b*, 9257*c* and 9257*d* are extended from the bottom surface 9256.

Moreover, the lower receiving container 9250 includes a first reinforcing portion 9259*a* that is extended from an end portion of the third sidewall 9257*c* connected to the first sidewall 9257*a* of the lower receiving container 9250 adjacent to the first reinforcing member 1230*a* toward an inner portion of the lower receiving container 9250, so that the first reinforcing portion 9259*a* has a cross-sectional view of an L-shape.

Moreover, the lower receiving container 9250 further includes a second reinforcing portion 9259*b* that is extended from an end portion of the fourth sidewall 9257*d* connected to the second sidewall 9257*b* of the lower receiving container 9250 adjacent to the second reinforcing member 1230*b* toward an inner portion of the lower receiving container 9250, so that the second reinforcing portion 9259*b* has a cross-sectional view of an L-shape.

The first and second reinforcing portion 9259*a* and 9259*b* formed on the lower receiving container 7270 may prevent that the display device 9000 is bent in a vertical direction thereof, that is, a length direction in which the first and second reinforcing portions 9259*a* and 9259*b* are formed.

As described above, the display device according to the present invention includes the reinforcing member pressing down on the LGP and irradiating heat of the light source assembly and the coupling member coupling the reinforcing member to the lower receiving container, so that light efficiency may be increased and a stiffness of the display device may be enhanced. Thus, costs due to defects of the LGP and the display device may be decreased, and reliability and display quality of the display device may be enhanced.

The foregoing is illustrative of the present teachings and is not to be construed as limiting thereof. Although a few example embodiments have been described, those skilled in the art will readily appreciate after reading this disclosure that many modifications are possible in the example embodiments without materially departing from the novel teachings and advantages of the present disclosure. Accordingly, all such modifications are intended to be included within the scope of the present disclosure. In the below claims, means-plus-function clauses are intended to cover the structures described herein as performing the recited function and not only structural equivalents but also functionally equivalent structures. Therefore, it is to be understood that the foregoing is illustrative of the present teachings and is not to be construed as limited to the specific example embodiments disclosed, and that modifications to the disclosed example embodiments, as well as other example embodiments, are intended to be included within the scope of the teachings.

What is claimed is:

1. A display device comprising:
 a light source assembly emitting lights;
 a light guide plate (LGP) guiding lights emitted from the light source assembly that is disposed at a first light receiving side surface thereof;
 a lower receiving container comprising a first bottom surface and a first sidewall and structured to receive the light source assembly and the LGP, the lower receiving container comprising a first coupling portion formed on the first bottom surface;
 a reinforcing member comprising a pressing down part structured to press down on an upper surface adjacent to a corner portion of the LGP, the reinforcing member further having a fixing part extending from an end portion of the pressing down part in parallel with a first sidewall of the lower receiving container to have a second coupling portion being coupled with the first coupling portion, the reinforcing member covering the light source assembly;
 a display panel disposed above the LGP and above the reinforcing member and structured to display images using the lights exiting through the LGP; and
 an upper receiving container covering an edge portion of the display panel, the upper receiving container comprising a third coupling portion coupled to the first coupling portion and the second coupling portion by way of a coupling member extending there through.

2. The display device of claim 1, further comprising a mold frame disposed between the reinforcing member and the upper receiving container to surround an edge portion of the display panel.

3. The display device of claim 2, wherein the mold frame comprises a stopper formed in adjacent to a light incident surface of the LGP facing the light source assembly to prevent the LGP from making contact with the light source assembly.

4. The display device of claim 1, further comprising a separate corner side mold surrounding a corner of the display panel to fix the display panel, and
 wherein the corner side mold is disposed in adjacent to a corner of the display panel where the reinforcing member is disposed thereon.

5. The display device of claim 1, wherein the reinforcing member has a recess structured and disposed for guiding there-through a flexible circuit substrate which electrically connects the display panel and a driving substrate.

6. The display device of claim 1, wherein the first coupling portion comprises a protrusion surface protruded with respect to the bottom surface, the second coupling portion comprises a concave surface structured to make receiving contact with the protrusion surface, and the third coupling portion comprises a concave portion connected to the protrusion surface and the concave surface, and
 wherein a first coupling hole is formed through the protrusion surface, a second coupling hole is formed through the concave surface, and a third coupling hole is formed through the concave portion.

7. The display device of claim 6, further comprising a mold frame disposed between the reinforcing member and the upper receiving container to surround an edge portion of the display panel,
 wherein the mold frame has defined there-through one or more coupling holes aligned to corresponding the first, second and third coupling holes through which the coupling member extends.

8. The display device of claim 1, wherein the pressing down part of the reinforcing member comprises a reflective cover portion covering an upper portion of the light source assembly, and
 the fixing part of the reinforcing member comprises a reflection portion covering a side portion of the light source assembly opposite to a light incident surface of the LGP surface to reflect light leakage from the light source assembly toward the light incident surface of the LGP.

9. The display device of claim 8, wherein the reinforcing member comprises a heat transfer material which transfers heat generated from the light source assembly away through the pressing down part and the fixing part.

10. The display device of claim 1, wherein the lower receiving container comprises a pressing down plate extended from an end portion of a second sidewall oppositing a first sidewall of the lower receiving container adjacent to the reinforcing member toward an inner portion of the lower receiving container, the pressing down plate pressing down on an upper surface adjacent to a corner of the LGP.

11. The display device of claim 1, wherein the lower receiving container comprises a reinforcing portion that is extended from an edge portion of a third sidewall connected to a first sidewall of the lower receiving container adjacent to the reinforcing member to be extended toward an exterior portion or an interior portion of the lower receiving container.

12. The display device of claim 11, wherein a reinforcing portion of the lower receiving container substantially has a cross-sectional view with an L-shape.

13. The display device of claim 1, wherein the coupling member is coupled with the first, second and third coupling portions in a front mounting method.

14. The display device of claim 1, further comprising a cushion disposed between the reinforcing member and the display panel to support the display panel.

15. The display device of claim 1, wherein the reinforcing member comprises at least one light reflecting material selected from a group consisting of a material comprising aluminum, a material comprising magsium and an alloy material of a polycarbonate and a glass fiber.

16. The display device of claim 1, wherein a cross-sectional view of the reinforcing member is an L-shape.

17. The display device of claim 1, wherein the light source assembly comprises a plurality of light sources,
the light source and the reinforcing member are plural in numbers, respectively.

18. The display device of claim 1, wherein the light source assembly is disposed between the first side surface of the LGP and the coupling member.

19. The display device of claim 1, wherein the reinforcing member further comprises a reflection member disposed at an inner portion thereof surrounding the light source assembly.

20. A display device comprising:
a light source assembly emitting lights;
a light guide plate (LGP) guiding lights emitted from the light source assembly that is disposed at a first side of the LGP;
a lower receiving container comprising a bottom surface and a first sidewall to receive the light source assembly and the LGP, the lower receiving container comprising a first coupling portion formed on the first bottom surface;
a reinforcing member comprising a pressing down part pressing down on an upper surface adjacent to a corner portion of the LGP and a fixing part extending from an end portion of the pressing down part in parallel with a first sidewall of the lower receiving container to have a second coupling portion being coupled with the first coupling portion, the reinforcing member covering the light source assembly;
a display panel disposed on the LGP and the reinforcing member to display images using the lights exiting through the LGP;
an upper receiving container covering an edge portion of the display panel, the upper receiving container comprising a third coupling portion coupled to the first coupling portion and the second coupling portion through a coupling member; and
a mold frame disposed between the reinforcing member and the upper receiving container to support the display panel.

* * * * *